United States Patent [19]

Bopp

[11] Patent Number: 4,835,201
[45] Date of Patent: May 30, 1989

[54] COMPOSITIONS OF POLYPHENYLENE ETHER RESIN AND HIGH IMPACT POLYSTYRENE RESIN HAVING IMPROVED ULTRAVIOLET LIGHT RESISTANCE

[75] Inventor: Richard C. Bopp, West Coxsackie, N.Y.

[73] Assignee: General Electric Company, Selkirk, N.Y.

[21] Appl. No.: 867,314

[22] Filed: May 27, 1986

Related U.S. Application Data

[63] Continuation of Ser. No. 570,330, Jan. 13, 1984, abandoned.

[51] Int. Cl.⁴ ............................................. C08K 5/34
[52] U.S. Cl. ................................. 524/102; 524/336; 524/337; 524/611; 525/68; 525/92; 525/905
[58] Field of Search ............... 524/102, 611, 336, 337; 568/333; 525/68, 92, 905

[56] References Cited

U.S. PATENT DOCUMENTS

| | | | |
|---|---|---|---|
| 3,086,988 | 4/1963 | Gordon | 568/333 |
| 3,925,509 | 12/1975 | Cooper et al. | 525/905 |
| 4,016,138 | 4/1977 | Anderson | 524/611 |
| 4,024,093 | 5/1977 | Abolins | 524/611 |
| 4,288,631 | 9/1981 | Ching | 524/337 |
| 4,315,848 | 2/1982 | Dester et al. | 524/102 |
| 4,373,055 | 2/1983 | Hoaf et al. | 525/905 |
| 4,385,146 | 5/1983 | Axelrod | 524/611 |
| 4,444,934 | 4/1984 | Kasahara et al. | 524/611 |

OTHER PUBLICATIONS

A. R. Patel et al. "Ultraviolet Stabilization of Polymers: Development with Hindered-Amine Light Stabilizers". Stabilization & Degradation of Polymers, David L. Allara et al., Advances in Chemical Series No. 169, American Chemical Society, D.C. 116–132 (1978).

*Primary Examiner*—Jacob Ziegler
*Attorney, Agent, or Firm*—Hedman, Gibson, Costigan & Hoare

[57] ABSTRACT

The ultraviolet light stability of polyphenylene ether resins and blends is improved by the addition of small amounts of certain 2-hydroxy-4-hydroxylated alkyl ether benzophenones and hindered amines in combination. The benzophenones are specifically characterized by an alkoxy substituent which contains one or more pendent hydroxy groups. Comparison with the closest prior art shows better UV performance. Plasticized, flame retardant and filled versions are also disclosed.

24 Claims, 6 Drawing Sheets

COMPOSITIONS OF POLYPHENYLENE ETHER RESIN AND HIGH IMPACT POLYSTYRENE RESIN HAVING IMPROVED ULTRAVIOLET LIGHT RESISTANCE

This is a continuation of application Ser. No. 570,330, filed Jan. 13, 1984, now abandoned.

BACKGROUND OF THE INVENTION

The polyphenylene ether (oxide) resins are high performance engineering thermoplastics possessing relatively high melt viscosities and softening points, and which are useful in many commercial applications requiring high temperature resistance, including the formation of films, fibers and molded articles. The polyphenylene ether resins and methods of their preparation are described in U.S. Pat. Nos. 3,306,874 and 3,306,875 (Hay), U.S. Pat. Nos. 3,257,357 and 3,257,358 (Stamatoff), and elsewhere.

The polyphenylene ether resins are also known to be admixable with polystyrene resins, unmodified or modified with rubber, as disclosed in U.S. Pat. No. 3,383,435 (Cizek), to form blends which are extrudable or moldable into articles of various shapes and sizes.

Polyphenylene ethers are normally prone to undergoing discoloration, that is, yellowing, during processing at elevated temperatures and, after molding, upon exposure to ultraviolet (UV) light for extended periods. To improve the color stability of these polymers, stabilizing additives are sometimes included. For instance, Cooper, et al. in U.S. Pat. No. 3,925,509 disclose blends of polyphenylene ether resin and high impact, rubber-modified polystyrene resins which have been modified to be more ultraviolet light stable by adding a light absorbing compound selected from among hydroxybenzotriazoles, hydroxybenzophenones, and substituted derivatives thereof in combination with an organic nickel compound. In another case, Bennett in U.S. Pat. No. 3,563,934 discloses that an alkanolamine or a morpholine can be incorporated in a polyphenylene oxide resin to improve the flow and the thermal color stability of the polymer during molding, and to permit lighter colored objects to be more easily molded from the polymer.

The utilization of polyphenylene ether resin blends in a wider variety of commercial articles increases the likelihood that the polymer will be exposed to sunlight or strong indoor light during use, the UV radiation in either of which can cause discoloration of the plastic. It is desirable, therefore, to find additional ways of improving the UV-stability of the polymer with sacrificing other important properties.

Peter H. C. Shu has determined that combinations of an alkoxybenzophenone and a hindered amine provide unusually good improvements in the ultraviolet light stability of polyphenylene ether resins and blends. This development is described in the Shu application filed Dec. 22, 1983, now U.S. Pat. No. 4,555,538.

INTRODUCTION TO THE INVENTION

The present invention is based on the discovery that certain alkoxybenzophenones not disclosed by Shu in combination with certain hindered amines provide very good ultraviolet light stability in polyphenylene ether resins and blends and, moreover, the stability is better than that obtained with the best specific embodiment described by Shu. This is accomplished with good retention of other physical properties, including melt processbility, impact strength, heat deflection temperature, and flame resistance (if present).

The present stabilizer combination, which is described in further detail below, is useful in the following compositions in accordance with the invention:

The stabilizer combination is useful especially in the following types of compositions in accordance with this invention:

1. Blends comprising (a) polyphenylene ether resin and (b) stabilizer;
2. Blends comprising (a) polyphenylene ether resin, (b) stabilizer and (c) rubber modified, high impact poly(alkenyl aromatic) resin;
3. Blends comprising (a) polyphenylene ether resin, (b) stabilizer and (c) plasticizer, with or without (d) an impact strength modifier;
4. Flame retardant versions of any of the foregoing; and
5. Filled versions of any of the foregoing.

DESCRIPTION OF THE INVENTION

The invention, in its broadest aspects, comprises an admixtures of (a) a polyphenylene ether resin or a polyphenylene ether resin modified with an alkenyl aromatic resin; and

(b) an effective amount of an ultraviolet light stabilizer consisting of, in combination, (1) one or a mixture of two or more compounds having the formula in which $R^1$ is hydroxylated alkyl and $R^2$ is straight or branched alkyl; each R is, independently, hydrogen, hydroxy, alkoxy having from 1 to about 10 carbon atoms, alkyl having from 1 to about 10 carbon atoms, or aryl; and n and p are independently zero or an integer from 1 to the total number of replaceable hydrogen atoms on the ring; and (2) one or a mixture of two or more compounds having the formula in which R'' is alkyl, straight or branched, or aryl unsubstituted or substituted with, for instance, halogen, alkyl, alkoxy, etc.; and R''' is hydrogen or alkyl, but preferably hydrogen.

Compounds within Formula I above can be prepared by known methods. In one procedure, a 2,4-dihydroxybenzophenone is condensation reacted with the glycidyl ether of an alkyl-substituted alcohol, for example, 2-ethyl hexanol, in the presence of a small amount of the sodium salt of the dihydroxybenzophenone as the catalyst. The reaction is preferably conducted in solution in an organic solvent, for example, 2-methoxy ethanol, using an elevated temperature, for example about 100° C.

Hindered amine compounds within Formula II above, which are tetraalkyl dipiperidinyl aliphatic diesters, can be prepared by referring to the procedures described in U.S. Pat. No. 3,640,928 (Murayama, et al.), which is incorporated herein by reference.

Preferably, component (b)(1) is included in a major amount and component (b)(2) in a minor amount, based on the total weight of (b). In general, (b)(1) is present in amounts of from about 0.5 to about 10 parts by weight, and (b)(2) in amounts of from about 0.05 to about 2 parts by weight, for each 100 parts of resin components. Larger amounts can be employed and may actually be desirable in some instances, but for most purposes the aforementioned proportions will be sufficient to achieve satisfactory results.

Preferred polyphenylene ether resins are homopolymers or copolymers having units of the formula in which Q, Q', Q" and Q''' are, independently, selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20, and more usually at least 50.

The polyphenylene ether resins are, in general, self-condensation products of monohydric, monocyclic phenols produced by reacting the phenols with oxygen in the presence of complex metal catalysts, with the molecular weight being controlled by the reaction time, longer times providing a higher average number of repeating units. Particular procedures are known to those skilled in the art and are described in the patent literature, including the Hay and Stamatoff patents mentioned above.

Suitable phenolic monomers include but are not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2-methyl-6-cyclohexylphenol; 2-methyl-6-tolylphenol; 2-methyl-6-methoxyphenol; 2-methyl-6-butylphenol; 2-6-dimethoxyphenol; 2,3,6-trimethylphenol; 2,3,5,6-tetramethylphenol; and 2,6-diethoxyphenol.

Some of the polymers which can be produced and which are within the above formula are: poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Also included within the above formula are copolymers prepared from mixtures of phenolic monomers. Special mention is made of those based on the reaction of 2,6-dimethylphenol with other phenols, for example, with 2,3,6-trimethylphenol or 2-methyl-6-butylphenol, to produce the corresponding copolymer, for example, poly(2,6-dimethyl-co-2,3,6-trimethyl-1,4-phenylene)ether, poly(2,6-dimethyl-co-2-methyl-6-butyl-1,4-phenylene)ether, and so forth.

Especially preferred for use in this invention are homopolymers having alkyl substituents in the two positions ortho to the oxygen ether atom, that is, those of the above formula in which Q and Q' are alkyl, and particularly alkyl having from 1 to 4 carbon atoms. Most preferred is poly(2,6-dimethyl-1,4-phenylene ether).

The preferred rubber modified, high impact alkenyl aromatic resins, when used, are those in which the alkenyl aromatic portion is derived at least in part from compounds of the formula wherein $R^1$ and $R^2$ are selected from the group consisting of lower alkyl or alkenyl groups of from 1 to 6 carbon atoms and hydrogen; $R^3$ and $R^4$ are selected from the group consisting of halogen, that is, fluoro, iodo, chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms, or $R^5$ and $R^6$ may be concatenated together with hydrocarbyl groups to form a naphthyl group.

Compounds within the above formula include styrene and its homologs and analogs. In addition to styrene, examples include alpha-methyl styrene, para-methyl styrene, 2,4-dimethyl styrene, chlorostyrene, dichlorostyrene, bromostyrene, dibromostyrene, fluoro or difluorostyrene, iodo or diiodostyrene, p-tert-butylstyrene, p-ethylstyrene, vinyl xylene, divinylbenzene, and vinyl naphthalene. Styrene is especially preferred.

Suitable rubber modifiers, which can be in admixture or interpolymerized with the alkenyl aromatic resin, include natural rubber, as well as synthetic rubbers such as polyisoprene, polybutadiene, polychloroprene, ethylene-propylene-diene terpolymers (EPDM rubber), styrene-butadiene copolymers (SBR rubber), styrene-acrylonitrile copolymers (SAN), ethylene-propylene copolymers (EPR rubber), acrylonitrile rubbers, polyurethane rubbers and polyorganosiloxane (silicone) rubbers.

The rubber content can vary widely but generally will range in amount from about 5 to about 45 percent by weight, depending on particular requirements of impact resistant modification.

The plasticizer will generally be any high boiling liquid or low melting solid having the effect of softening the composition and reducing the glass transition temperature of the polyphenylene ether resin. The plasticizer may be selected from among non-polymeric and polymeric materials known to exert these effects. By way of illustration, suitable types include linear aliphatic esters based on dibasic acids, such as adipates, azelates and sebacates, or linear aliphatic esters based on phosphorus. Other suitable types include cyclic esters, such as phthalates, terephthalates, benzoates and trimellitates.

Especially preferred are organic phosphate plasticizers, and particularly aromatic phosphate compounds of the formula in which each Q represents the same or a different radical selected independently from among alkyl, cycloalkyl, aryl, alkyl-substituted aryl, aryl-substituted alkyl, halogen, and hydrogen, with at least one Q always being aryl.

Examples include phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl)phosphate, diphenyl hydrogen phosphate, bis(2-ethylhexyl) p-tolylphosphate, tritolyl phosphate, bis-(2-ethylhexyl) phenyl phosphate, tri(nonyl-phenyl)phosphate, phenylmethyl hydrogen phosphate, di(-dodecyl)p-tolyle phosphate, tricresyl phosphate, triphenyl phosphate, dibutylphenyl phosphate, 2-chloroethyldiphenyl phosphate, p-tolyl-bis(2,5,5'-trimethylhexyl)phosphate, 2-ethylhexyldiphenyl phosphate, diphenyl hydrogen phosphate, and the like. Most preferred are triphenyl phosphate and its derivatives, for example, isopropylated triphenyl phosphate.

Particular mention is also made of polymeric plasticizing resins, and especially polystyrene homopolymers, which have a plasticizing function and can be used for this purpose in the present blends.

In general, amounts of up to about 30 parts by weight, per 100 parts of the total polymeric ingredients, are employed in the plasticized embodiments, with particular amounts being dependent upon specific requirements.

Plasticized compositions in accordance with the invention can and often do not also include effective amounts of an impact strength enhancing modifier or modifiers. These may be selected from polymeric materials customarily employed for this purpose. Typically, they will be copolymers or terpolymers of alkenyl aromatic compounds of the formula shown above with rubber or elastomeric precursors. Preferred are linear block, graft or radial teleblock copolymers or terpolymers of styrene and butadiene, or of styrene and isoprene, as well as hydrogenated versions thereof in which the unsaturation of the aliphatic portion has been reduced. The amounts are conventional.

Other ingredients can and often are included in the compositions. These may be selected from among the various materials customarily employed in polyphenylene ether resin blends, including flame retardant agents, mineral fillers (for example, clay, talc, mica or aluminum silicate), reinforcing agents (for example, glass fibers, flakes or spheres or titanate fibers), coloring agents (for example, dyes or pigments), plasticizers, odor suppressants, mold release agents, flow enhancing agents (for example, melt viscosity reducers), and so forth. Those may be employed singly or in various combinations, in amounts which are conventional.

The compositions of this invention may also be formulated to contain one or more flame retardant agents, alone or in combination with supplementary materials known to synergistically enhance their effect. Such additives may be selected from among the numerous materials known to those skilled in the art, which in general will be those compounds, or oligomers or polymers, containing chemical elements employed for their ability to impart flame resistance, for example, bromine, chlorine, antimony, phosphorus and nitrogen. Examples include various aliphatic and aromatic phosphates, phosphonates and phosphites; halogenated (brominated or chlorinated) organic compounds; halogenated organic compounds in admixture with antimony oxide; halogen-containing compounds in admixture with phosphorus compounds containing phosphorus-nitrogen bonds; halogenated (brominated or chlorinated) polymers such as polystyrene and aromatic polycarbonates or their lower molecular weight oligomeric counterparts.

Special mention is made of flame retardant organophosphate compounds, including aromatic phosphate flame retardant-plasticizers such as found among the compounds mentioned above; brominated or chlorinated bis-phenoxy alkanes, e.g., 1,2-bis(2,4,6-tribromophenoxy)ethane or 1,2-bis(2,3,4,5,6-pentabromophenoxy)ethane; di- or polyfunctional phosphates such as disclosed in British Pat. No. 2,043,083; and brominated or chlorinated polystyrenes. Especially preferred are triphenyl phosphate and isopropylated triphenyl phosphate. Amounts of up to 30 parts by weight for each 100 parts of the polymeric components present in the blends are typical.

The compositions may be prepared into shaped articles in any convenient manner. In one procedure, the ingredients are dry or solution blended, the mixture is passed through a screw extruder at a temperature from about 450° to about 650° F., the extrudate is cooled and chopped into pieces, and the pieces are injection molded at a temperature of from about 450° to about 650° F.

The compositions may be prepared into any of the articles for which polyphenylene ether resins and blends are known. They are especially suitable for types of products intended for use in the outdoors where they will be exposed to the sun, or indoors under strong artificial light, either of which can change the original color of the plastic. Illustratively, the present kinds of blends can be manufactured into grilles, headlamp bezels, wheelcovers and decorative trim on automobiles, home laundry and dishwater consoles, air conditioner grilles, personal care or home use products such as coffee makers, food processors, curling irons, and shower massagers, bases and housings for office business machines, TV cabinets, and so forth.

DESCRIPTION OF THE SPECIFIC EMBODIMENTS

The invention is illustrated in the following examples. These are intended to show best or preferred embodiments and should not be construed as a limitation on the scope of the invention.

In the Examples, the UV resistance was measured by monitoring color change throughout the course of an exposure to a high intensity UV source. The exposure time to a prescribed objectionable color change is then used to judge the relative UV performance of different materials. More particularly, two sets of polyphenylene ether resin formulations were prepared and test plaques molded for them were exposed to xenon arc radiation under a glass filter of 0.13 inch thickness in an Atlas Fadeometer. The UV irradiance at 420 nanometers (nm) was maintained at 1.47 watts/square meter. The black panel temperature and relative humidity were controlled to 63° C. and 50%, respectively.

Figure 1:
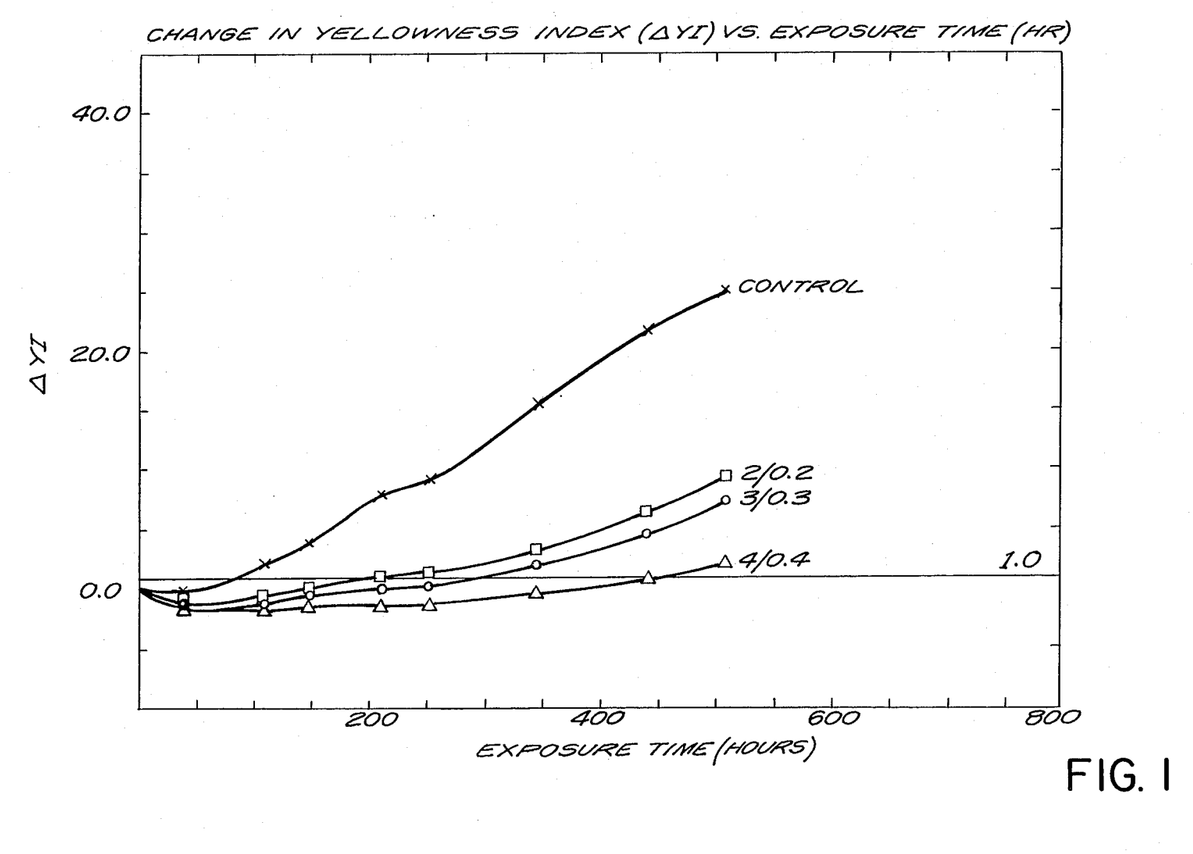
FIG. 1 is a plot of the change in yellowness index, $\Delta YI$, versus the amount of exposure time, in hours, of the molded blends in accordance with the prior art blends (Examples 1A, 2A, 3A and control below).
Figure 2:
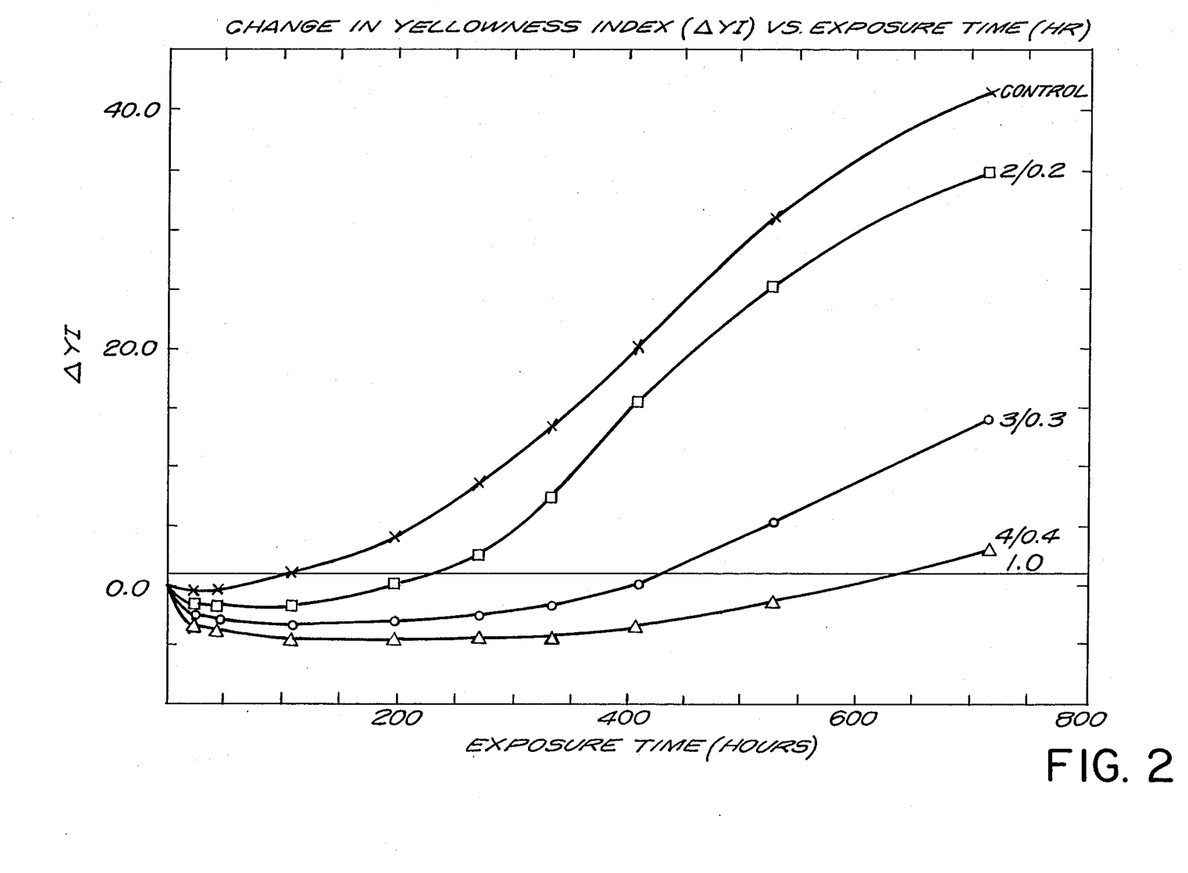
FIG. 2 is a plot of the change in yellowness index, $\Delta YI$, versus the exposure time in hours of molded blends in accordance with the invention (Examples 1, 2, 3 and control, below.
Figure 3:
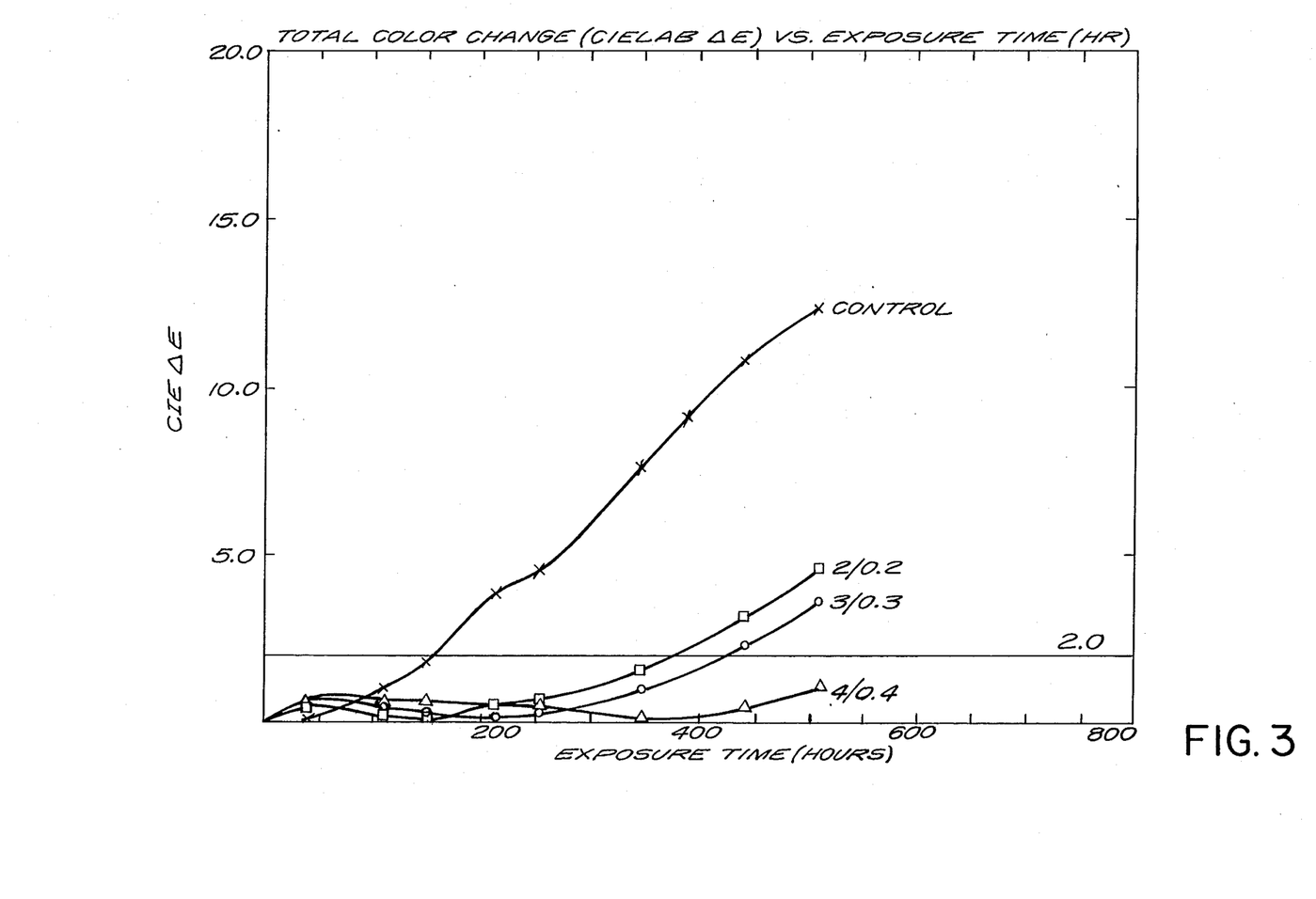
FIG. 3 is a plot of the change in color, $\Delta E$, versus exposure time in hours of the same blends in accordance with the prior art as in FIG. 1.
Figure 4:
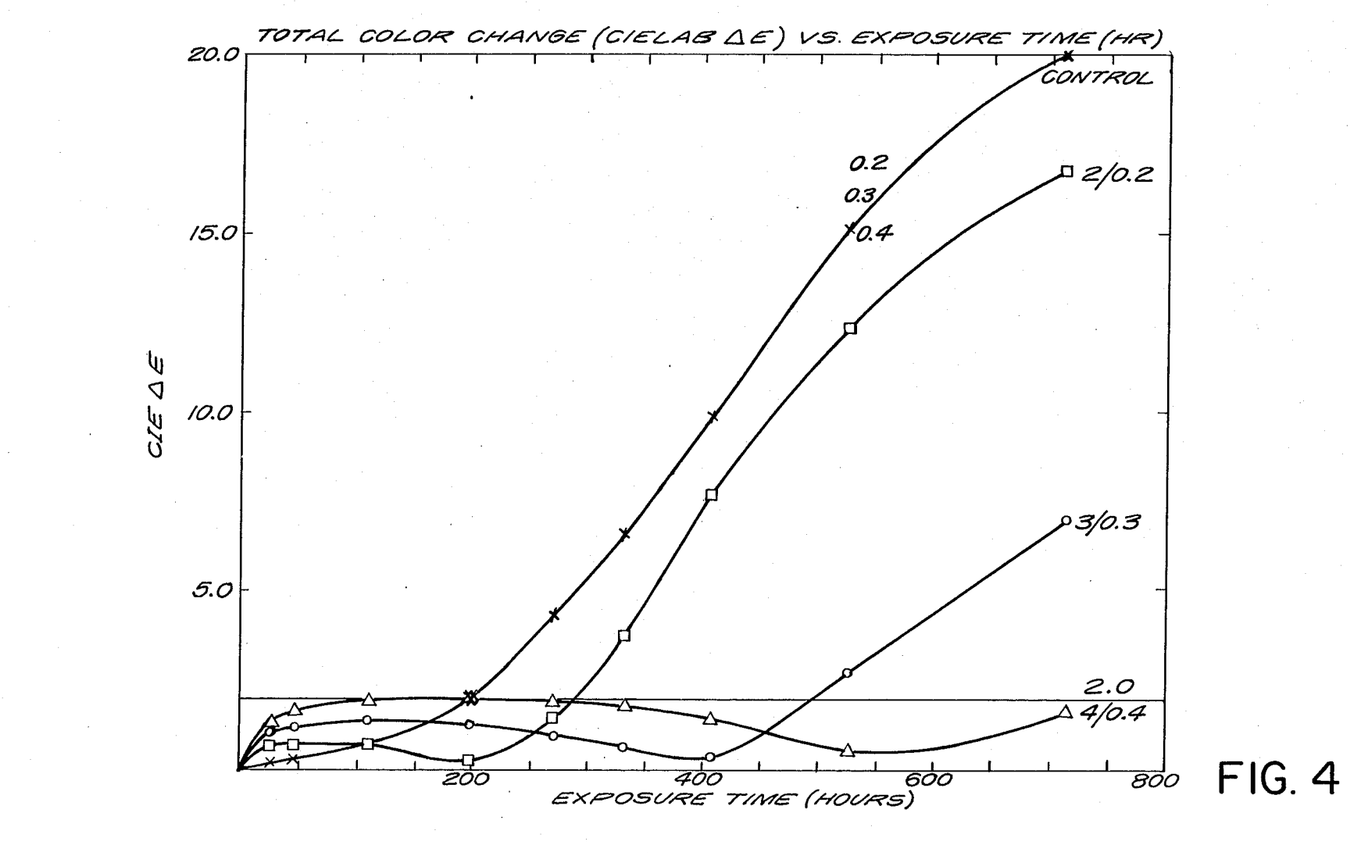
FIG. 4 is a plot of ΔE versus exposure time in hours of the same blends in accordance with the invention as in FIG. 2.
Figure 5:
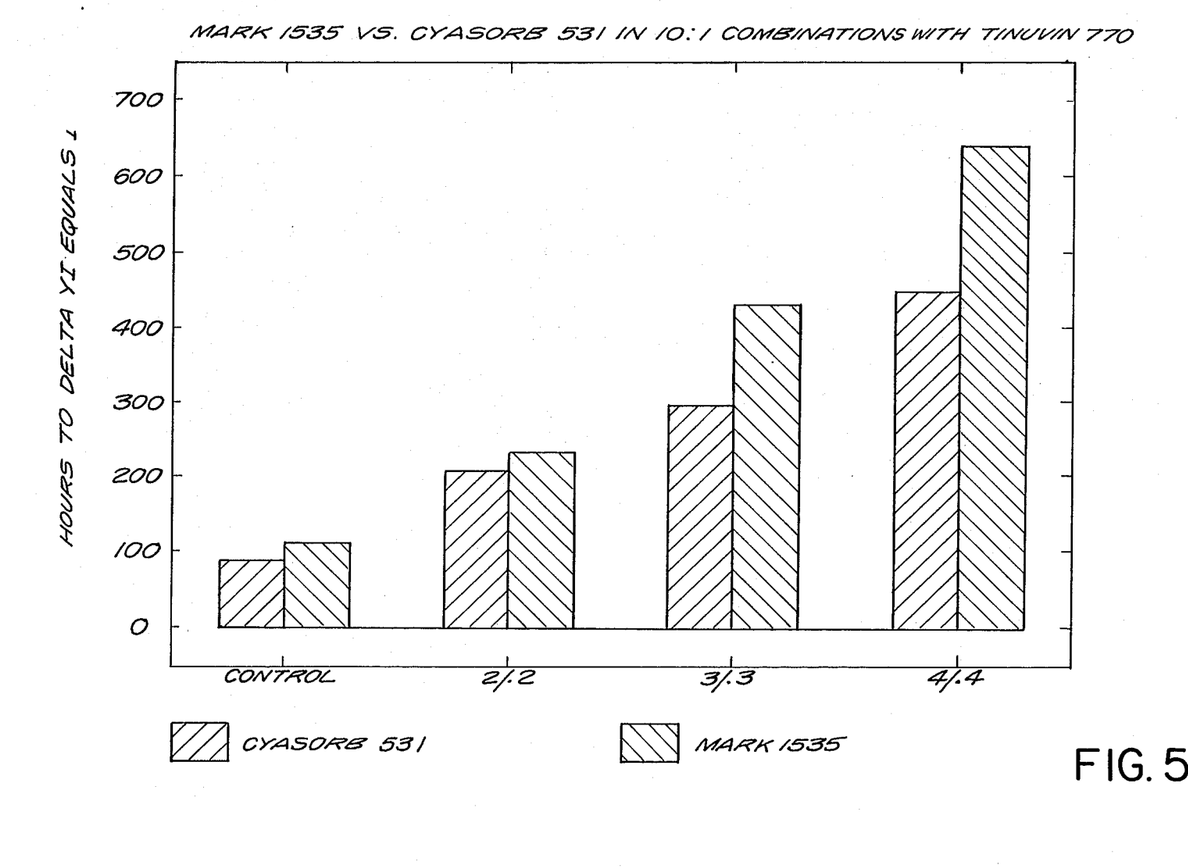
FIGS. 5 and 6 are comparisons of the UV stability between both sets of blends with respect to ΔYI and ΔE, respectively.
Figure 6:
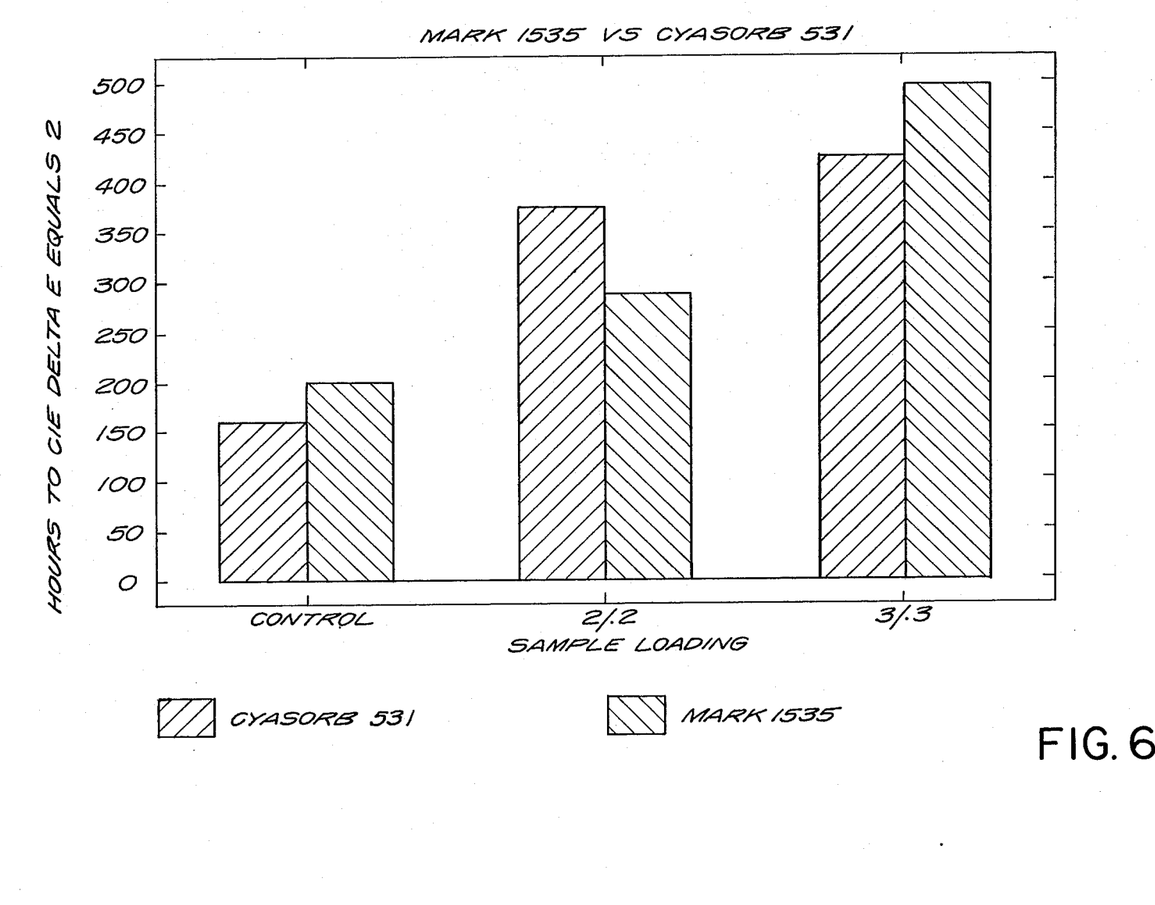

Tristimulus color measurements were made throughout the course of the test using a Gardner XL-23 colorimeter interfaced with a microcomputer. Color change was judged by monitoring the change in yellowness index (ASTM D1925) and total color change (CIELAB delta E). The relative UV performance of these material was in turn determined by comparison of the relative exposure times to ΔYI=1.0, to ΔE=2.0. Averaged ΔYI values are presented in Tables 1 and 2 and in FIGS. 1 and 2. The corresponding comparisons of total color change vs. exposure are given in Tables 1 and 2, and in FIGS. 3 and 4. Comparison of the UV performance in he form of bar graphs are shown in FIGS. 5 and 6.

EXAMPLES 1-3

Compositions in accordance with the invention were prepared by forming an admixture of 40 parts by weight of poly(2,6-dimethyl-1,4-phenylene ether) resin (PPO ®, General Electric Co.), 60 parts by weight of polybutadiene rubber-modified high impact polystyrene resin (Foster Grant's FG-834 HIPS), 13 parts by weight of isopropylated triphenyl phosphate flame retardant-plasticizer (KRONITEX 50, FMC Corp.). 1.5 parts by weight of polyethylene (REXENE 126), 0.15 parts by weight of zinc oxide, 0.15 part by weight of zinc sulfide, 0.5 part by weight of tridecyl phosphite, 3.0 parts by weight of titanium dioxide, and an ultraviolet light stabilizer composed of a 2-hydroxy-4-hydroxylated alkyl ether-benzophenone (MARK 1535, Witco Chemical Co.) and 2,2,6,6-tetramethyl dipiperidinyl sebacate (TINUVIN 770, Ciba-Geigy Corp.) in the varying relative amounts shown.

Analysis of MARK 1535 by gas chromatography, mass spectroscopy and proton nuclear magnetic resonance indicated that it is composed of a mixture of at least two compounds having what appears to be the following respective structures:

and

For comparison with the prior art, blends were prepared to contain the same ingredients in the same amounts as above, except that the color stabilizer was composed of, in combination, 2-hydroxy-4-n-octoxybenzophenone (CYASORB 531, American Cyanamid Co.) and TINUVIN 770. A control blend containing no stabilizer components was prepared for each set of blends.

The blends were extruded at 500° F. and injection molded at 450° F. into identical 2"×2" test plaques, then tested with the results reported in Tables 1 and 2 below.

TABLE 1

Change in Yellowness Index, ΔYI, and color, ΔE, of Mark 1535 + Tin. 770 (This Invention)

| Ex. | Amt. Mark 1535 | Amt. Tin 770 | hrs. exp. to ΔYI = 1 | hrs. exp. to ΔE = 2 |
|---|---|---|---|---|
| Control | — | — | 112.0 | 200.0 |
| 1 | 2.0 | 0.2 | 232.0 | 288.0 |
| 2 | 3.0 | 0.3 | 432.0 | 496.0 |
| 3 | 4.0 | 0.4 | 640.0 | 120.0 |

TABLE 2

Change in Yellowness Index, ΔYI, and color, ΔE, of Cyasorb 531 and Tin 770 (Prior Art)

| Ex. | Amt. CYA 531 | Amt. TIN 770 | hrs. exp. to ΔYI = 1 | hrs. exps to ΔE = 2 |
|---|---|---|---|---|
| Control | — | — | 88.0 | 166.0 |
| 1A* | 2.0 | 0.2 | 208.0 | 376.0 |
| 2A* | 3.0 | 0.3 | 296.0 | 424.0 |
| 3A* | 4.0 | 0.4 | 448.0 | greater than 500 |

*comparison

Example 3 above showed some bleaching early during the test, resulting in a ΔE value slightly greater than 2 at 120 hours but did not yellow beyond ΔE=2 after more than 700 hours of exposure.

All of the patents mentioned above are incorporated herein by reference.

Other modifications and variations of the invention are possible in light of the above disclosure. For, instance, clay filled or glass reinforced versions of the blends are possible. It is to be understood, therefore, that changes may be made in the particular embodiments shown which are within the scope of the invention as defined in the appended claims.

I claim:

1. A thermoplastic composition, comprising an admixture of (a) a polyphenylene ether resin alone or together with an alkenyl aromatic resin; and

(b) an effective amount of an ultraviolet light stabilizing combination of (1) one or a mixture of two or more compounds having the formula in which $R^1$ is hydroxylated alkylene with $R^2$ is straight or branched alkyl; each R is, independently, hydrogen, hydroxy, alkoxy having from 1 to about 10 carbon atoms, alkyl having from 1 to about 10 carbon atoms, or aryl; and n and p are independently zero or an integer from 1 to the total number of replaceable hydrogen atoms; and (2) one or a mixture of two or more compounds having the formula in which R" is alkylene, straight or branched, or aryl unsubstituted or substituted with halogen, alkyl or alkoxy, and R''' is hydrogen or alkyl.

2. A composition according to claim 1, in which the polyphenylene ether resin is a homopolymer or copolymer having units of the formula in which Q, Q', Q" and Q''' are, independently, selected from the group consisting of hydrogen, halogen, hydrocarbon radicals, halohydrocarbon radicals, hydrocarbonoxy radicals, and halohydrocarbonoxy radicals, and n represents the total number of monomer units and is an integer of at least about 20.

3. A composition according to claim 1, in which the polyphenylene ether resin is poly(2,6-dimethyl-1,4-phenylene ether).

4. A composition according to claim 1, in which (b)(1) is present in an amount from about 0.5 to about 10 parts by weight, and (b)(2) is present in an amount from about 0.05 to about 5 parts by eight, per 100 parts of (a).

5. A composition according to claim 1, in which (b)(1) is a 2-hydroxy-4-hydroxylated alkyl ether-benzophenone or mixture of two or more such compounds.

6. A composition according to claim 1, in which (b)(1) comprises a mixture of compounds having the following respective formulae:

and

7. A composition according to claim 1, in which (b)(2) is 2,2,6,6-tetramethyl dipiperidinyl sebacate.

8. A composition according to claim 1, which includes (c) a rubber modified high impact poly(alkenyl aromatic)resin.

9. A composition according to claim 8, in which the alkenyl aromatic resin comprises at least some units of the formula wherein $R^1$ and $R^2$ are selected from the group consisting of lower alkyl or alkenyl groups of from 1 to 6 carbon atoms and hydrogen; $R^3$ and $R^4$ are selected from the group consisting of halogen, hydrogen and lower alkyl of from 1 to 6 carbon atoms; $R^5$ and $R^6$ are selected from the group consisting of hydrogen, lower alkyl and alkenyl groups of from 1 to 6 carbon atoms, or $R^5$ and $R^6$ are concatenated together with hydrocarbyl groups to form a naphthyl group.

10. A composition according to claim 9, in which the alkenyl aromatic resin is polystyrene.

11. A composition according to claim 10, in which the rubber modifier for the polystyrene is polybutadiene.

12. A composition according to claim 8, in which the weight ratio of polyphenylene ether resin (a) and rubber modified, high impact poly(alkenyl aromatic) resin (c) is between 5:95 and 95:5.

13. A composition according to claim 1, which includes an effective amount of (c) a plasticizer.

14. A composition according to claim 13, in which the plasticizer is present in an amount up to about 30 parts by weight per 100 parts of the polymeric components in the composition.

15. A composition according to claim 13, in which the plasticizer is an aromatic phosphate compound.

16. A composition according to claim 15, in which the aromatic phosphate is triphenyl phosphate.

17. A composition according to claim 16, in which the triphenyl phosphate is isopropylated.

18. A composition according to claim 13, which includes (d) an impact modifier.

19. A composition according to claims 1, 8, 13, or 18, which includes a flame retardant amount of a flame retardant agent.

20. A composition according to claim 1, 8, 13, 18 or 19 which includes a material selected from the group consisting of mineral fillers, glass reinforcements and mixtures of both.

21. A composition according to claim 1 wherein component (b)(1) is present in an amount of from about 2.0 to about 10.0 parts by weight for each 100 parts of (a).

22. A composition according to claim 21 wherein component (b)(1) is present in an amount about 10 times greater than component (b)(2).

23. A composition according to claim 6 wherein component (b)(1) is present in an amount of from about 2.0 to about 10.0 parts by weight for each 100 parts of (a).

24. A composition according to claim 23 wherein component (b)(1) is present in an amount about 10 times greater than component (b)(2).

* * * * *